(12) United States Patent
Marchetti

(10) Patent No.: US 8,787,539 B2
(45) Date of Patent: Jul. 22, 2014

(54) METHOD AND DEVICE FOR COUPLING A DC SUPPLY LINE TO A TELEPHONE LINE OR COAXIAL CABLE

(75) Inventor: Stefano Marchetti, Osimo AN (IT)

(73) Assignee: A TLC S.R.L., Rome (IT)

( * ) Notice: Subject to any disclaimer, the term of this patent is extended or adjusted under 35 U.S.C. 154(b) by 0 days.

(21) Appl. No.: 14/001,886

(22) PCT Filed: Mar. 1, 2012

(86) PCT No.: PCT/IB2012/050974
§ 371 (c)(1),
(2), (4) Date: Oct. 24, 2013

(87) PCT Pub. No.: WO2012/117371
PCT Pub. Date: Sep. 7, 2012

(65) Prior Publication Data
US 2014/0037077 A1   Feb. 6, 2014

(30) Foreign Application Priority Data

Mar. 1, 2011   (IT) ............................... AN2011A0029

(51) Int. Cl.
*H04M 11/00* (2006.01)
(52) U.S. Cl.
USPC ....................................... 379/93.01; 370/352
(58) Field of Classification Search
None
See application file for complete search history.

(56) References Cited

U.S. PATENT DOCUMENTS

2006/0238250 A1 * 10/2006 Camagna et al. ............. 330/253

FOREIGN PATENT DOCUMENTS

WO    WO-2007/121148 A2    10/2007

* cited by examiner

*Primary Examiner* — Maria El-Zoobi
(74) *Attorney, Agent, or Firm* — Novak Druce Connolly Bove + Quigg LLP

(57) ABSTRACT

A coupling device that implements a related method for remote powering wide band digital telecommunication devices through telephone lines or coaxial cables installed in all buildings, has an AC blocking transistor inserted in the electrical path from a voltage supply line to the telephone line or coaxial cable. The transistor has a first current terminal coupled to the supply line and a second current terminal coupled to the telephone line, and it is controlled with a DC control voltage such to keep it in a substantially linear functioning condition at the edge of a saturation condition during the normal functioning whatever the supply current that flows through the transistor is, destined to the connected telecommunication devices. This may be done by properly generating this control voltage by means of a dedicated voltage generator, or by nullifying the DC component of the difference of potential between the control terminal and the second current terminal, for example through a low-pass filter that generates the voltage on the control terminal as a low-pass replica of the voltage on the second current terminal.

19 Claims, 12 Drawing Sheets

METHOD AND DEVICE FOR COUPLING A DC SUPPLY LINE TO A TELEPHONE LINE OR COAXIAL CABLE

CROSS REFERENCE TO RELATED APPLICATIONS

This application is a National Phase filing under 35 U.S.C. §371 of PCT/IB2012/050974 filed on Mar. 1, 2012; and this application claims priority to Application No. AN2011A000029 filed in Italy on Mar. 1, 2011, under 35 U.S.C. §119; the entire contents of all are hereby incorporated by reference.

FIELD OF THE INVENTION

The invention relates in general to remotely powering systems for wide-band bidirectional communications and more particularly to a device that implements a related method for coupling a DC power supply line to a telephone line or coaxial cable and related devices for injecting and for drawing a supply current in/from a telephone line or coaxial cable.

BACKGROUND

Nowadays, high rate digital telecommunication devices over cable, such as for example xDSL, Ethernet technologies etc, are even more diffused. Classically, telecommunication devices that use these technologies are connected to a line for transmitting/receiving data and are supplied through another line connected to the electric mains.

A problem tied to the use of these telecommunication devices consists in that they may be installed only where an electrical power supply line is available.

In order to overcome this limitation, it is possible to connect these telecommunication devices to purposely installed lines adapted to convey data transmitted to or received from the telecommunication system, and to provide the required supply current. Installing these lines is in general expensive and hardly can be done in existing buildings.

Theoretically speaking, it would be possible to use twisted pairs already available in all buildings, or coaxial cables, for conveying data and remote powering the above mentioned high rate digital telecommunication devices. Remote powering telecommunication devices through cable or twisted pair is known. For example, analog telephones, that are even less diffused, were powered and transmitted voice signals through twisted pairs.

To the best knowledge of the applicant, so far it has not been possible to use the same twisted pairs for transmitting wide-band digital signals (for example xDSL) and at the same time for powering telecommunication devices. Attempts for remote powering telecommunication devices using the same twisted pair used for transmitting/receiving digital data, by implementing the same technique used for powering classic analog telephones, have failed, thus showing beyond any doubt that wide band digital telecommunication devices have peculiar characteristics that make them substantially different from classic analog telephones.

More particularly, in classic analog telephones, twisted pairs were used for DC powering and at the same time for transmitting a voice signal, that may be modeled as a low-pass signal concentrated in the frequency range from about 0 up to 4 kHz. Moreover, classic analog telephones needed relatively low supply voltages and currents, thus it was relatively simple to decouple the voice signal from the DC supply and making telephones powered as needed.

Differently, xDSL digital telecommunication devices need higher supply voltages and currents and further the frequency band of conveyed digital signals is in the order of several megahertz, that is of various order of magnitudes greater than the analog voice signal. The fact that the transmitted digital signals have a wide band makes particularly critical remote powering telecommunication devices with relatively high voltage and currents and ensuring a correct decoding of the digital signal and relatively small supply power losses along the line.

The published US patent application No. 2006/238250 provides for dynamic insertion loss control for a 10/100/1000 megahertz Ethernet power on differential cable pairs. A power feed circuit supplies power to a network attached device (PD). An insertion loss control circuit limits power loss in a coupled power feed circuit. The insertion loss control circuit determines an insertion loss limit and senses an average power of the power signals to produce a common mode feedback signal to the power feed circuit.

The published PCT application WO 2007/121148 discloses a network device for supplying power over Ethernet networks through a network device comprising a transformer with a primary winding and a secondary winding. The primary winding is coupled to receive input signals from a network connector and supply data signals to a physical layer (PHY) module. An inductance boost circuit is coupled to the secondary winding and operable to increase the impedance of the primary winding.

The international patent application PCT/IT2011/000241 in the name of the same applicant discloses devices for injecting and drawing a supply current in/from a telephone line or coaxial cable (shown in FIGS. 1a and 1b, respectively) that, according to studies carried out before realizing a tested prototype, would have been capable respectively of:

injecting/drawing a DC supply current in/from a twisted pair for a plurality of telecommunication devices connected thereto together with a stream of xDSL digital data; and separating the power supply of each telecommunication system from the respective stream of xDSL digital data.

In an inexplicable manner, the disclosed devices were not capable of remote powering telecommunication devices connected to the twisted pair and at the same time complying with the specifications ruled by international laws for this particular use of twisted pairs, unless the distance between the transmitting device and the receiving device was relatively short. As a matter of fact, the disclosed devices did not comply with the specifications in all case of practical because, for having the desired voltage level in input to the remote powered telecommunication devices, interest it was necessary to raise the supply voltage upstream beyond the maximum limits imposed by specifications, in order to take into account unexpected voltage drops, the origin of which was not understood.

SUMMARY

Further studies and related experiments carried out by the applicant showed that the wide band of digital signals as well as the relatively high supply voltage of digital telecommunication devices make particularly critical the realization of a device for transmitting data and remote powering that allows to make available downstream the requested supply current at the requested supply voltage.

More in detail, the circuit block 127 (in FIG. 1a depicted as an inductor), that was used for adding the supply current to the xDSL digital signals before sending them on the twisted pair, caused voltage drops that made possible to power a telecommunication system only if it was connected at a distance of no more than few meters from the transmission interface, and this distance rapidly shortens when the number of telecommunication devices powered through the twisted pair increases. In practice, the inductor 127 was requested to behave as a short-circuit for the DC supply and a high impedance circuit for digital signals, such to make the latter be sent down the twisted pair and substantially not shunted towards the supply line 118.

The digital signals to be transmitted are distributed over a very wide frequency band and must be received with a relatively great signal to noise ratio in order to be correctly decoded, thus the inductor 127 had to show a high impedance even at relatively low frequencies for not reducing the level of the signal sent down the twisted pair. This led unavoidably to increase the number of turns of the inductor and as a consequence to increase Ohmic losses. These losses are greater the greater the number of telecommunication apparatuses remotely powered through the twisted pair is, and they are practically such to limit strongly the maximum distance from which a telecommunication apparatus could be placed while complying with the constraint of maximum supply voltage imposed by specifications.

This led to the conclusion that, in order to make these interface function in real working conditions, it was necessary to devise a coupling device capable of letting only a DC current (the DC supply) to pass practically without losses and at the same time of behaving like a high impedance (virtually infinite) circuit in the whole frequency band of the digital signals.

Extended researches led the applicant to devise a coupling device compliant to all these requirements that implements a related method for remote powering wide band digital telecommunication devices, for example of xDSL type, through telephone lines or coaxial cables installed in all buildings.

This exceptional result has been obtained by inserting an AC blocking transistor in the electrical path from a voltage supply line to the telephone line or coaxial cable, having a first current terminal coupled to the supply line and a second current terminal coupled to the telephone line, the AC blocking transistor being controlled with a DC control voltage such to keep it in a substantially linear functioning condition at the edge of a saturation condition during the normal functioning whatever the supply current that flows through the transistor is, destined to the connected telecommunication devices.

This may be done by properly generating this control voltage by means of a dedicated voltage generator, or by nullifying the DC component of the difference of potential between the control terminal and the second current terminal, for example through a low-pass filter that generates the voltage on the control terminal as a low-pass replica of the voltage on the second current terminal.

Between the current terminals of the AC blocking transistor a parasitic capacitance of small value could be present, thus it could happen that high frequency signals be capable of bypassing the AC blocking transistor, thus reducing the high frequency content of the wide band signal sent through the twisted pair. If this case occurs, in order to reject even more strongly high frequency components, the AC blocking transistor shall be conveniently coupled to the twisted pair throughout an inductor, that preferably will have a low resistance in order to limit the dissipated power when telecommunication devices are powered through the twisted pair. In this case, the control voltage will be preferably a low pass replica of the voltage available on the terminal in common between the AC blocking transistor and the coupling inductor to the twisted pair.

According to an embodiment, this AC blocking transistor is a MOS or a BJT. Optionally, instead of the AC blocking transistor, an active electronic circuit may be used having at least a transistor biased in a linear functioning condition at the edge of a saturation functioning condition, installed in the electrical path of the supply current to be sent down the twisted pair.

The novel coupling device allows the realization of a device for injecting and a device for drawing a DC supply current, capable of transmitting and receiving signals through a twisted pair or a coaxial cable on which also a DC supply current is available for telecommunication devices connected thereto.

It is thus possible to realize also telecommunication systems for buildings equipped with a telephone line, in which there are users receiving signals through optical fibers, users having a common voice telephone line and users in which there are telecommunication devices for transmitting and receiving digital data that are remotely powered through the telephone line itself.

The claims as filed are integral part of this specification and are herein incorporated by reference.

DESCRIPTION OF EXEMPLARY EMBODIMENTS

In the ensuing description reference will be made for sake of ease to the case in which the blocking transistor is a MOS, that represents the preferred solution, though the same observations hold mutatis mutandis even for the case in which the blocking transistor is a bipolar transistor and more in general in the case in which the supply current of telecommunication devices connected to the twisted pair is delivered by a generic electronic device with active components having at least a transistor in a linear functioning condition at the edge of a saturation condition inserted in the electrical path crossed by the supply current.

Figure 2:
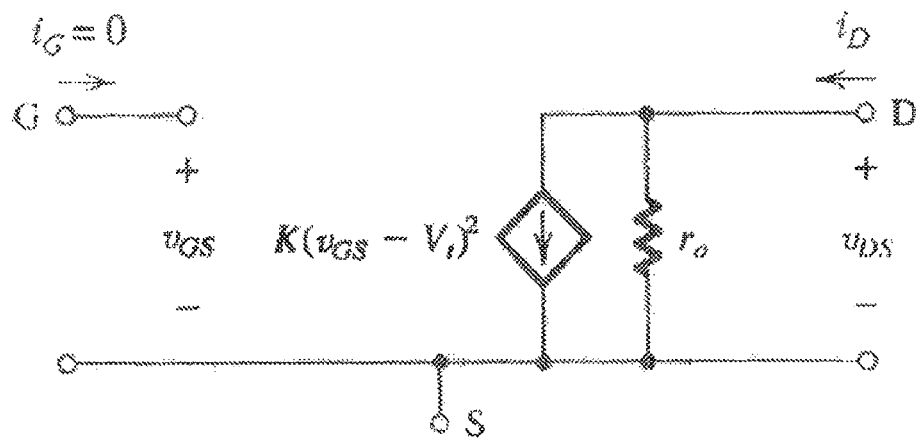
FIG. 2 shows a large-signal equivalent circuit of a MOS in a linear functioning condition at the edge of a saturation functioning condition.

In order to better understand how the novel electronic device may solve the technical problem of which the inventors become aware while testing prototypes of interfaces for remotely powering telecommunication devices through twisted pairs in real conditions, reference is made to FIG. 2 that depicts a large-signal equivalent circuit of a MOS in a linear functioning condition at the edge of a saturation condition. In the cited figure, $v_{GS}$ is the gate-source voltage, $v_{DS}$ is the drain-source voltage, $r_0$ is the output resistance, Vt is the threshold voltage, K is the characteristic parameter of the MOS determined by mobility of carriers, by the capacitance of the oxide and by the aspect ratio.

By controlling the gate of the transistor such to nullify the DC component of the gate-drain voltage $V_{GD}$, the blocking transistor will work in a linear functioning condition at the edge of a saturation condition because eventual fluctuations of the drain-source voltage $v_{DS}$, determined by noise and by the digital signal xDSL that it is necessary to transmit through the twisted pair, will be smaller than the threshold voltage Vt in all practical cases of interest.

The MOS working in a linear functioning condition at the edge of a saturation condition is capable of providing the necessary supply current for all telecommunication devices connected to the twisted pair simply by adjusting the gate-source voltage $v_{GS}$ to the functioning conditions determined by the drain-source current to be delivered.

Figure 3:
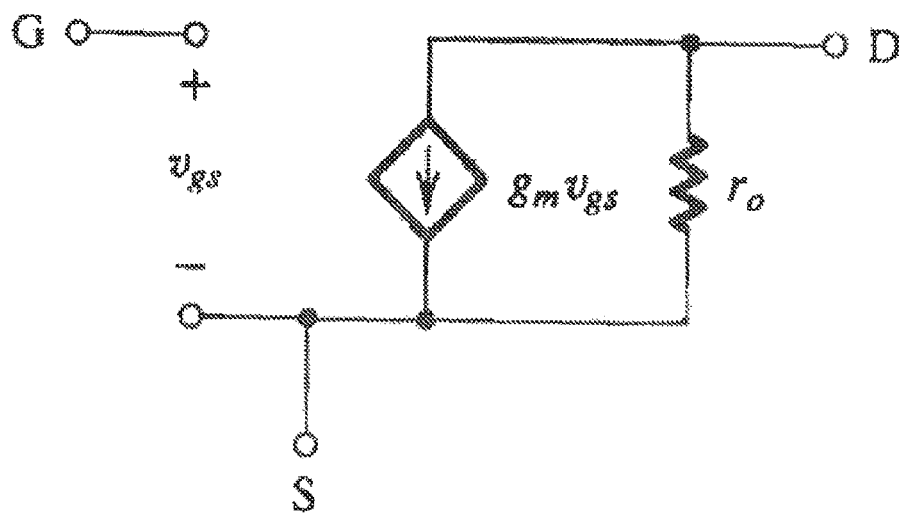
FIG. 3 depicts a small-signal equivalent circuit of a MOS in a linear functioning condition at the edge of a saturation functioning condition.

Given that the control voltage is a DC voltage and the source of the MOS is connected to the DC supply line, from the small-signals equivalent circuit depicted in FIG. 3 it may be inferred that the transistor will behave as a resistance r0 for AC signals. Indeed, fluctuations of the gate-source voltage $v_{gs}$ are null and thus the blocking transistor will behave as a resistance $r_0$ in respect to fluctuations of the drain-source voltage $v_{ds}$. The output resistance of a MOS in a linear functioning condition at the edge of the saturation condition may be typically in the order of hundreds of kΩ, the digital signals xDSL will be blocked by the MOS, that will let the supply current pass instead.

It is possible to demonstrate that losses caused by the MOS are always negligible in all cases of practical interest. The gate-source voltage $v_{GS}$ in a MOS functioning in a linear functioning condition at the edge of a saturation condition is tied to the drain current $i_D$ with the following law:

$$v_{GS} = V_t + \sqrt{\frac{i_D}{K}}.$$

Because of the way in which the blocking transistor is controlled, the drain-source voltage $v_{DS}$ practically matches the gate-source voltage $v_{GS}$, and thus the dissipated power by the MOS is about:

$$v_{DS} \cdot i_D \cong V_t \cdot i_D + \frac{(i_D)^{\frac{3}{2}}}{\sqrt{K}}.$$

For relatively small currents $i_D$ injected through twisted pairs, the power dissipated by the MOS is about proportional to the current $i_D$ that flows therethrough, the proportionality factor being the threshold Vt, that is relatively small; for relatively great currents $i_D$, the dissipated power will depend mainly from the term $$(i_D)^{\frac{3}{2}}.$$

Figure 1A:
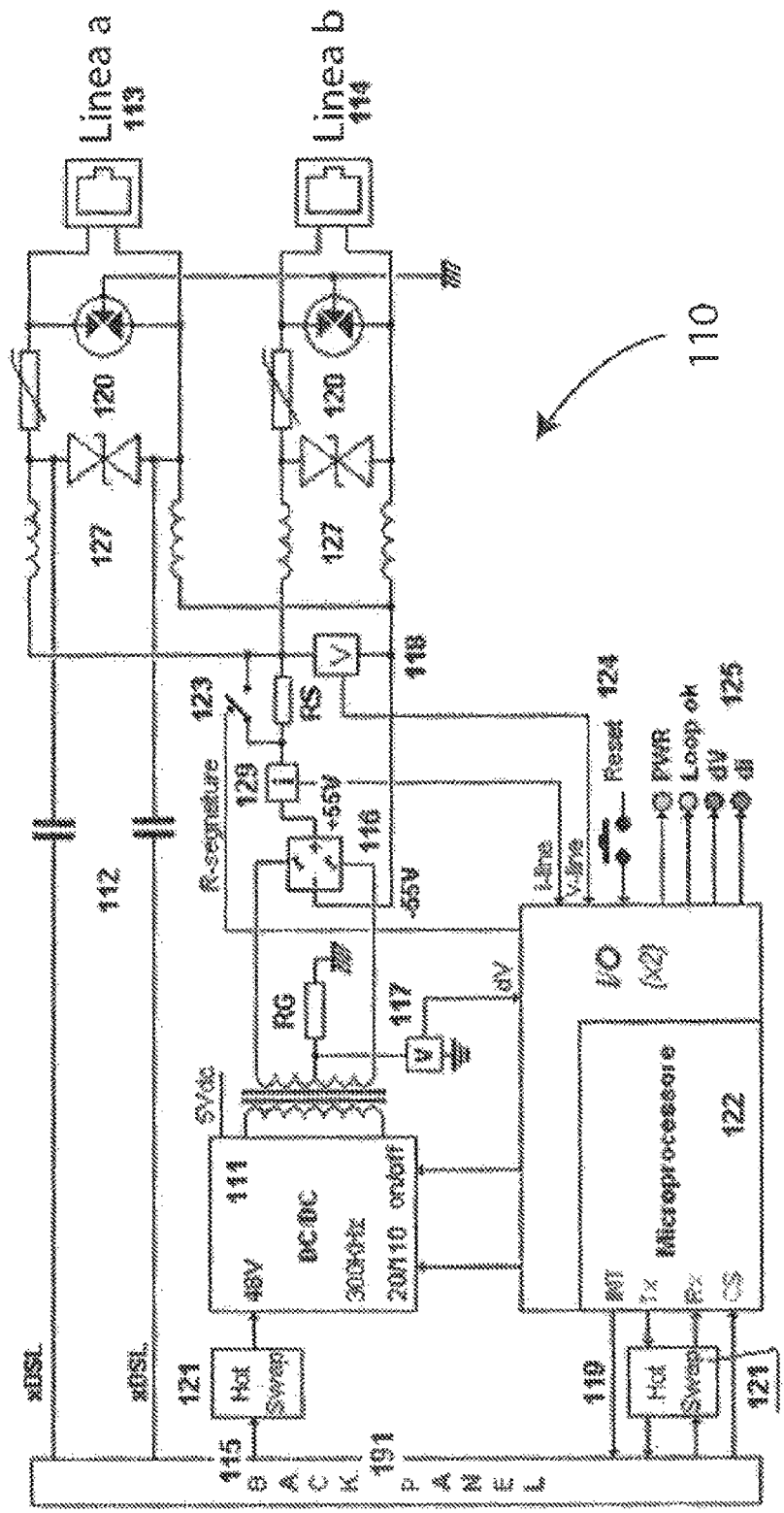
FIGS. 1a and 1b respectively show the transmitting device and the receiving device disclosed in the international patent application PCT/IT2011/000241 in the name of the same applicant.
Figure 1B:
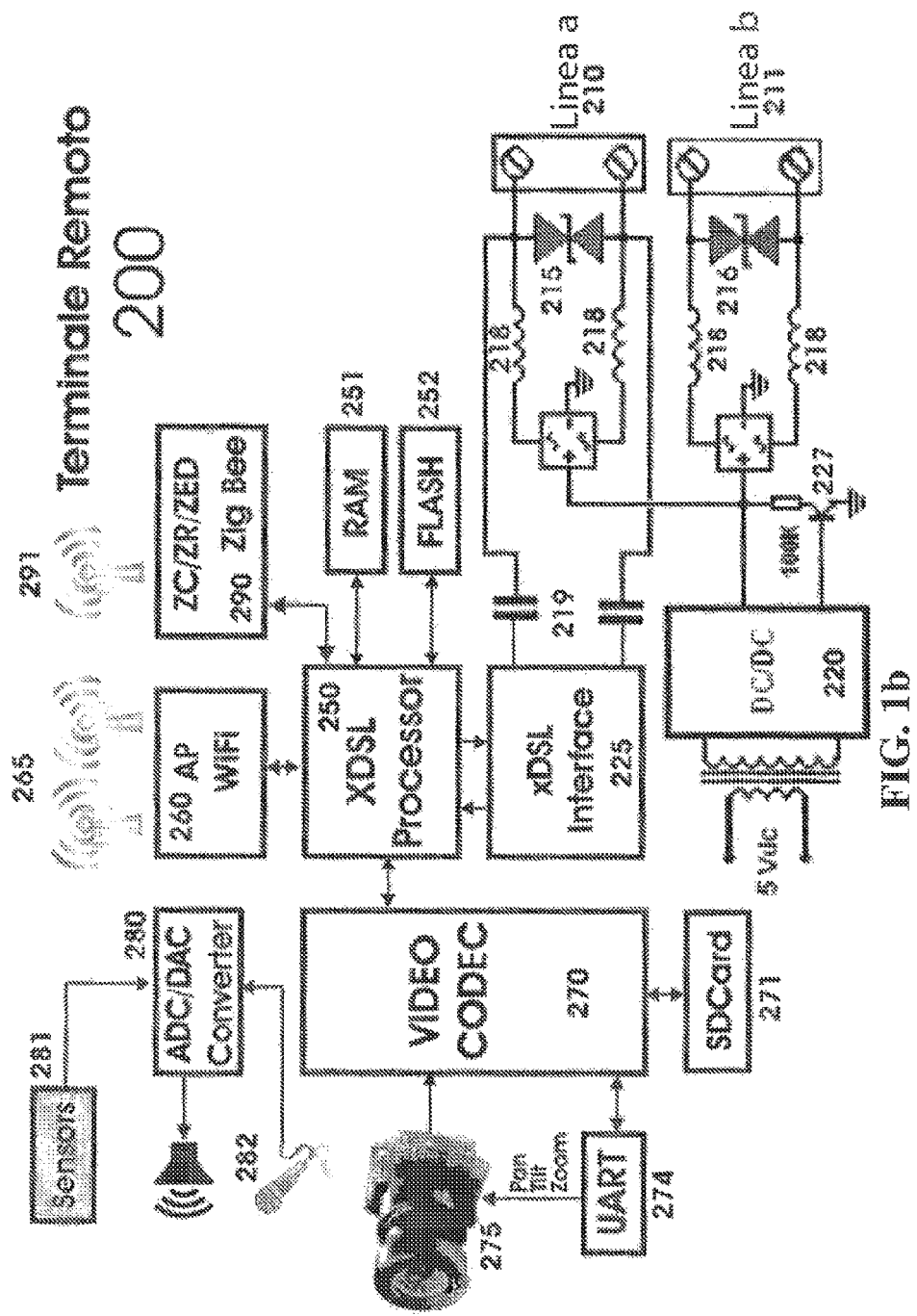

Since the dissipated power by the twisted pair is proportional to $(i_D)^2$ and to the resistance of the twisted pair, that is not negligible particularly when the telecommunication apparatus to be powered is relatively distant from the supply line, the power dissipated by the MOS is small compared to the power dissipated by the twisted pair in all cases of practical interest. Therefore, by inserting the novel device in an interface for transmitting data and remote powering through twisted pairs as that shown in FIG. 1, it is possible to use the twisted pair for remotely supplying also at relatively great distance a plurality of telecommunication devices that transmit/receive data through the twisted pair.

Figure 4:
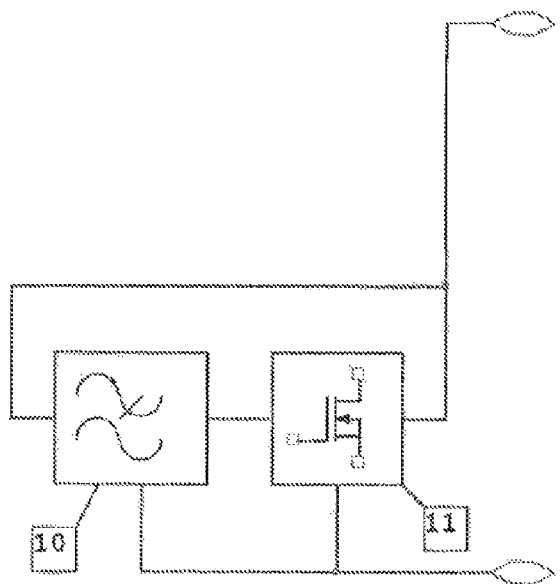
FIG. 4 depicts an embodiment of the herein proposed coupling device, having an AC blocking transistor controlled in a linear functioning condition at the edge of a saturation condition by a low-pass filter.

An embodiment of the novel coupling device is shown in FIG. 4. A first current terminal (source) of the blocking transistor is referred to the line at the supply voltage, the second current terminal (drain) is coupled to the twisted pair such to inject the supply current, and the control terminal of the transistor (gate) is controlled by a low-pass replica of the drain voltage.

The low-pass filter 10 filters out from the control terminal of the blocking transistor 11 any frequency component above a certain cut-off frequency Ft. An exemplary value of this cut-off frequency Ft is 0.072 Hz. This exemplary value of the frequency Ft has been chosen considering the case in which the device is used in a communication system in which a video signal SD (Standard Definition) is to be sent substantially without any attenuation and distortion. In general, the cut off frequency Ft will be preferably fixed such that Ft<<Fsmin/10, wherein Fsmin is the minimum frequency of the data signal sent down the twisted pair (in this case around a tenth of Hz).

The blocking transistor 11 will behave, from an electrical point of view, as a current sink (HZ_N) or source (HZ_P) at a very high impedance. Its control terminal, driven by the output of the low-pass filter, is substantially biased at a voltage close to the threshold voltage Vt, in order to limit power losses when a supply current is delivered. For frequency signals smaller than the cut-off frequency of the low-pass filter, the device depicted in FIG. 5 will behave as an impedance the value of which is smaller the smaller the frequency of the signal is. Any skilled person will be capable of determining, depending on specific requirements (band-pass, signal dynamics, power dissipation, scale reduction, etc.) and on the above considerations, the most appropriate electronic components for the considered application (MOS, BJT, FET, Darlington, etc).

Between the current terminals of the blocking transistor 11 there is a parasitic capacitance of small value, it may occur that high frequency components of the transmitted signal through the twisted pair or coaxial cable bypass the blocking transistor. As a consequence, digital signals sent through the twisted pair or coaxial cable may have very high frequency components more attenuated than their components at lower frequencies.

Figure 5:
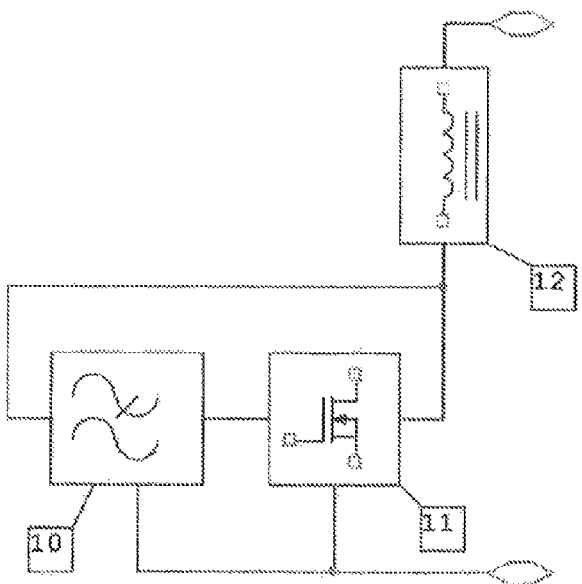
FIG. 5 depicts another embodiment of the herein proposed coupling device, having a coupling inductor of the AC blocking transistor to the twisted pair.

In order to prevent this inconvenient that could occur when ultra wide band signals are transmitted, such as for example the xDSL digital signals, it may be convenient to insert a coupling inductor 12 between the second current terminal (drain) of the blocking transistor and the twisted pair or coaxial cable, as shown in FIG. 5. This coupling inductor acts as a very high impedance for high frequency components and practically as a short circuit for the DC supply current to be injected.

The coupling inductor 12 will be a non ideal inductor, for its frequency response characteristics. According to an embodiment, it will be composed of an inductor of ferrite of sufficiently great value (obtained with the use of amorphous ferrite produced, for example, by Hitachi, Metglas, Hilltech) with another passive component (called "chip beads" or "ferrite beads") typically employed in EMC fields, in order to reduce electromagnetic emissions from conductors on electronic boards or on connection circuits (series MMZ1608Bxxxxx TDK or series LF0805Axxxx or 35F0121 Lairdtech). The circuit of FIG. 5, properly dimensioned for each specific application, will behave as a high loss inductor (with a very high resistive component) and thus with a very low quality factor. With this peculiar characteristic of the novel device, any resonance phenomenon that could take place by connecting it with the output impedance of the active device 11 (typically capacitive impedance) will be attenuated or even canceled. Depending on the band-pass of the communication signal transmitted over the twisted pair, it is possible to define in an appropriate manner the whole device by choosing the characteristics of the various blocks that compose it. Tests on functioning prototypes showed that the device of FIG. 5 may deliver a DC supply current with a very small impedance and at the same time have a high and practically constant impedance on a frequency band from 10 Hz up to hundreds of megahertz.

Figure 6A:
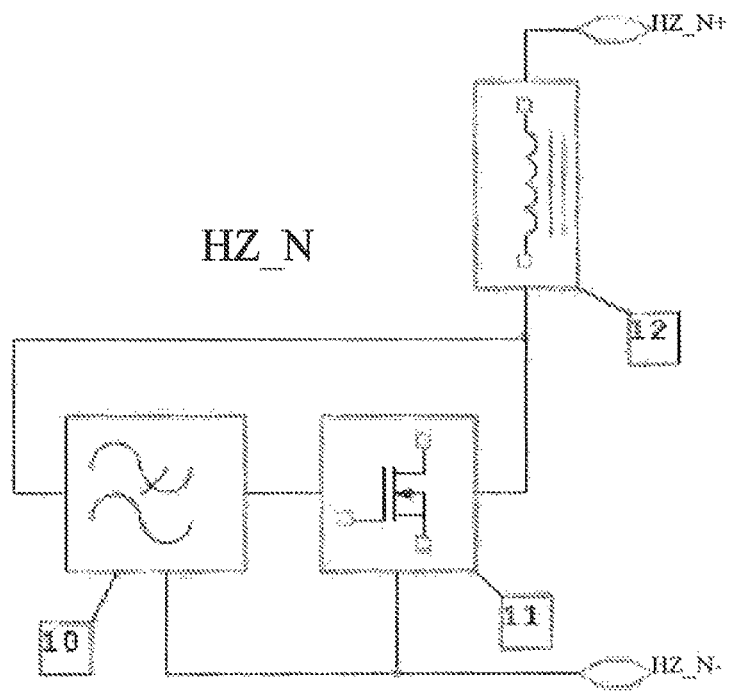
FIGS. 6a and 6b show embodiments of the herein proposed coupling device that use respectively a N-type transistor and a P-type transistor.
Figure 6B:
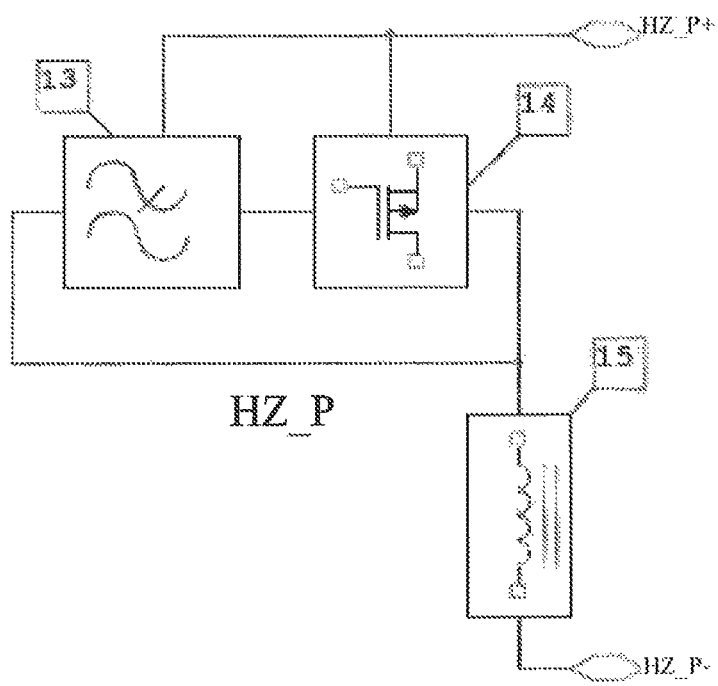

FIG. 6a shows the preferred embodiment of the device that uses a N-type MOSFET; FIG. 6b shows the device realized with a P-type MOSFET.

Figure 7:
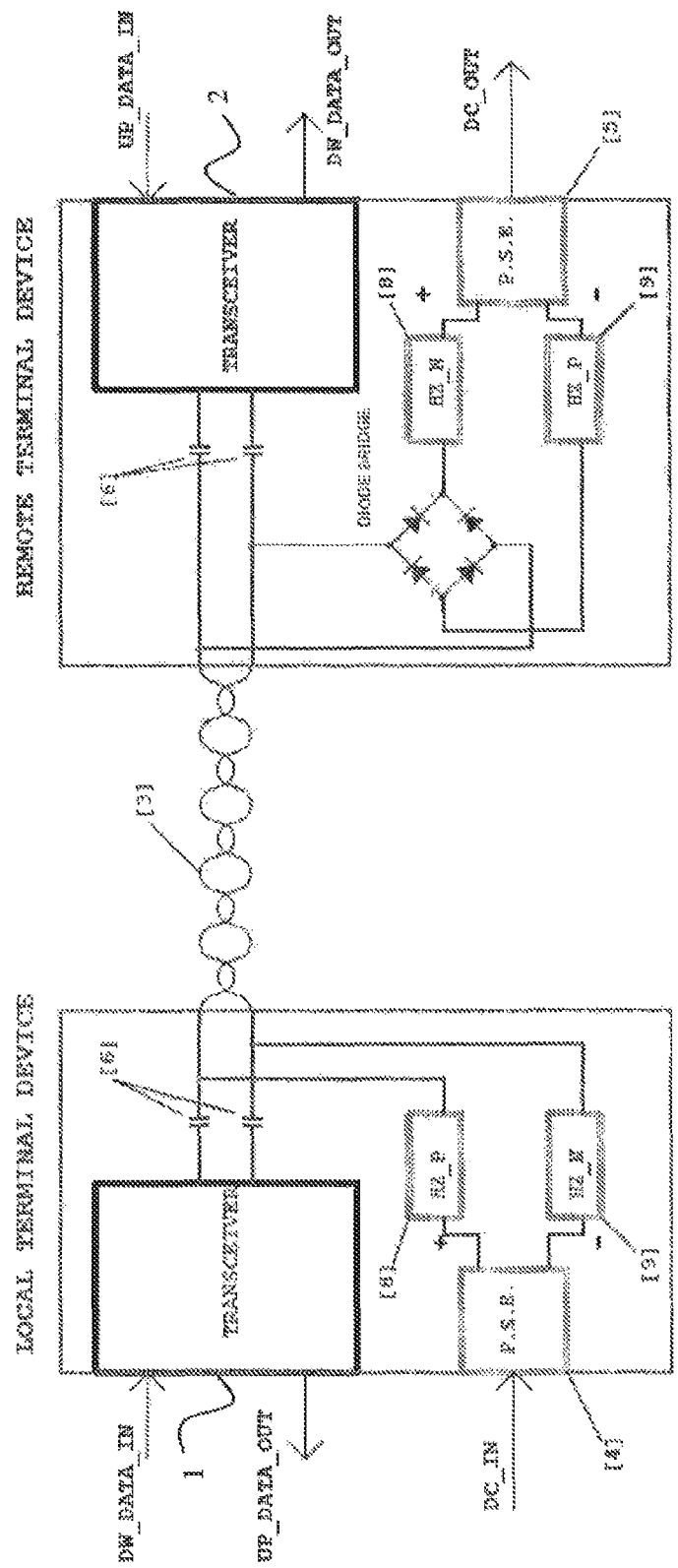
FIG. 7 shows a device for injecting and a device for drawing a supply current in/from a twisted pair crossed also by digital and/or phone signals of telecommunication devices connected thereto, that use the coupling devices of FIGS. 6a and 6b.
Figure 8:
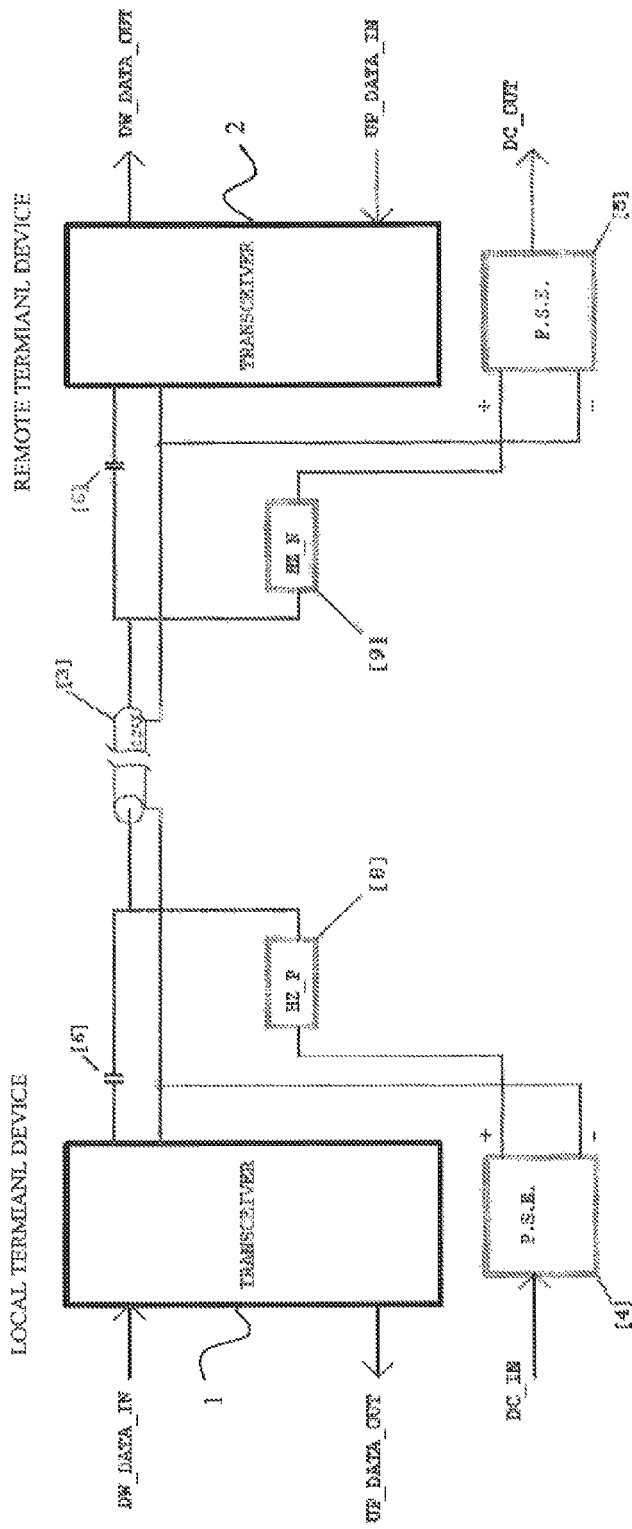
FIG. 8 shows a device for injecting and a device for drawing a supply current in/from a coaxial cable crossed by digital signal and/or telephone signals of telecommunication devices connected thereto, that use the coupling devices of FIGS. 6a and 6b.

FIGS. 7 and 8 show remotely powered bi-directional telecommunication devices through a twisted pair or coaxial cable in which the coupling devices HZ_N and HZ_P of FIGS. 6a and 6b are present. The functions of the blocks and of the signals shown in FIGS. 7 and 8 are summarized in the following table:

| LOCAL TERMINAL DEVICE | Device for injecting a supply current in a telephone line |
|---|---|
| DW_DATA_IN | downstream data to be transmitted to the telecommunication system through the telephone line |
| UP_DATA_OUT | upstream data transmitted by the telecommunication system through the telephone line |
| TRANSCEIVER | transceiver |
| DC_IN | DC supply to be provided to the telecommunication system coupled to the telephone line |
| P.S.E. | power supply equipment |
| HZ_P | coupling device of FIG. 6b |
| HZ_N | coupling device of FIG. 6a |
| REMOTE TERMINAL DEVICE | remote interface for drawing a supply current from a telephone line |
| DW_DATA_OUT | downstream data provided to the telecommunication system |
| DC_OUT | DC supply provided to the telecommunication system coupled to the telephone line |
| UP_DATA_IN | upstream data coming from the telecommunication system to be transmitted through the telephone line |

Some blocks are functionally simplified when the system is mono-directional, i.e. signals flow only in one direction of the realized connection. The transmitting connection 3 may be balanced (twisted pair) or unbalanced (coaxial cable, as shown in FIG. 8). The system will be described for applications with a balanced transmitting means and in particular for highlighting its ability of conveying through this connection without alterations even HD format video signals. The functional blocks called "TRANCEIVER" 1 and 2, that performs the transmission and reception of the signals on a transmitting connection 3, will contain a line driver, a high sensitivity receiver, filters, an echo cancellation circuit, a line equalizer, eventual signal analysis and acquisition systems, and more generally every circuits necessary for signal processing, in order to exploit in the best way the transmitting means for transferring the signal according to well known techniques to skilled persons. These blocks may be constituted by analog parts as well as digital parts. For example, for transferring a digital video signal, it is possible to use a block Transceiver SERDES that uses a very wide band for transferring in a serial fashion the sampled data, while for the same type of video signal the block will be analog if the transfer takes place in the base-band (from few tens of Hz up to few tens of MHz). In both systems of FIGS. 7 and 8 it is possible to notice the blocks for inserting 4 and drawing 5 the DC remote power supply with the coupling capacitances 6 of the digital signal.

In the system of FIG. 7 there is a diode bridge, preferably realized with Schottky diodes in order to keep power dissipation low, in order to prevent any problem of polarity of the connection of the remote terminal, due to the use of the twisted pair.

Figure 9:
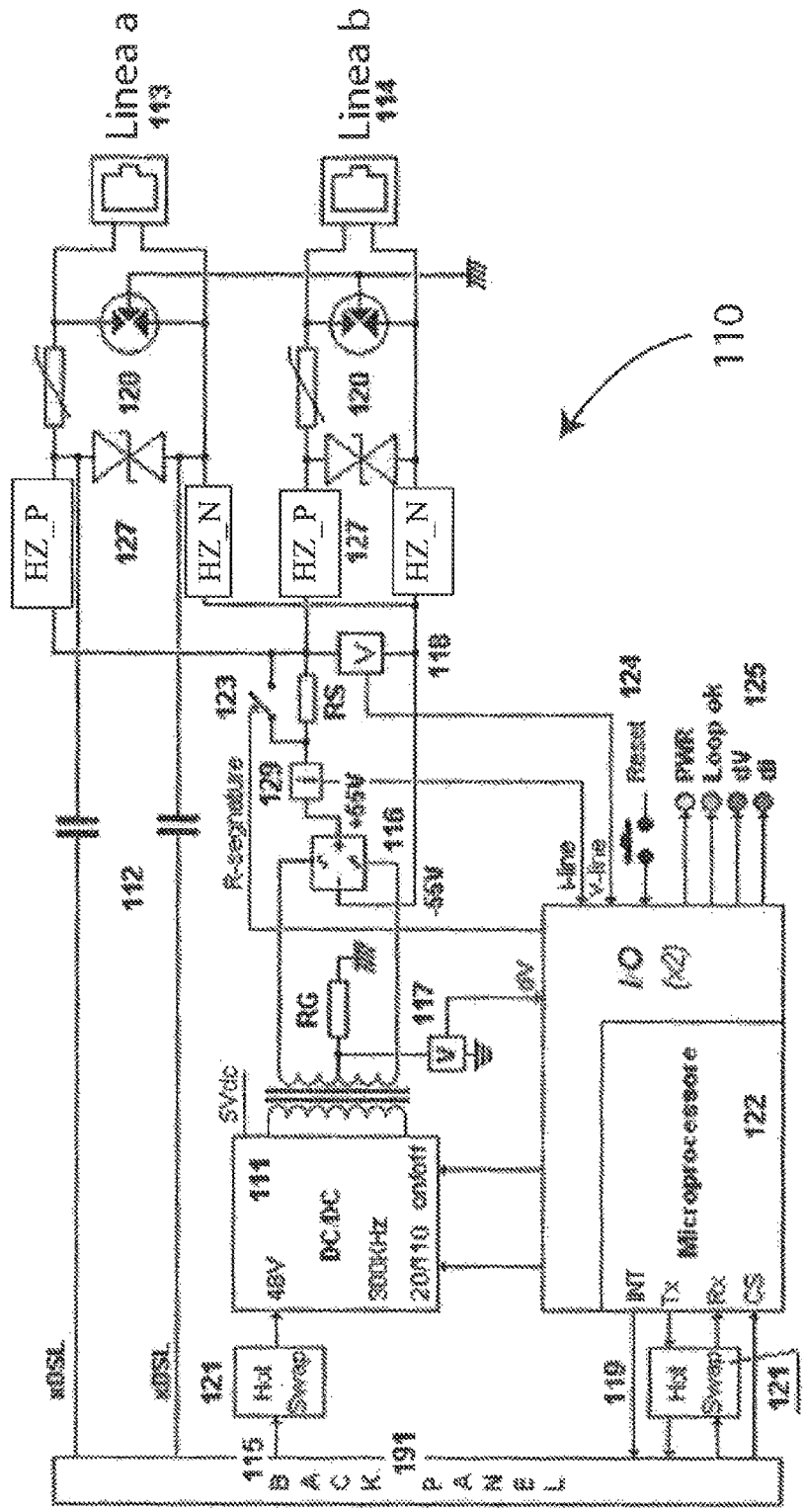
FIG. 9 shows a current injection device similar to that disclosed in the international patent application PCT/IT2011/000241, though capable of working on existing telephone systems, that uses the coupling devices of FIGS. 6a and 6b.

Using the devices depicted in FIG. 6a or 6b it is possible to realize a remote power supply device of the type disclosed in the international patent application PCT/IT2011/000241 shown in the enclosed FIG. 9. The circuit blocks in the enclosed FIG. 9 are identical to and have the same function of the same-name blocks depicted in FIG. 4 of the international patent application PCT/IT2011/000241, herein incorporated by express reference, and in the excerpts of the description that refer to it. Differently from what is shown in the cited international patent application, the blocks 127 are not inductors with a great number of turns, but are each composed by the coupling device shown in FIGS. 6a and 6b. By using the device depicted in the enclosed FIG. 9, it is effectively possible to remote power a relevant number of telecommunication devices through twisted pair while using the same twisted pair for transmitting and/or receiving data.

Figure 10:
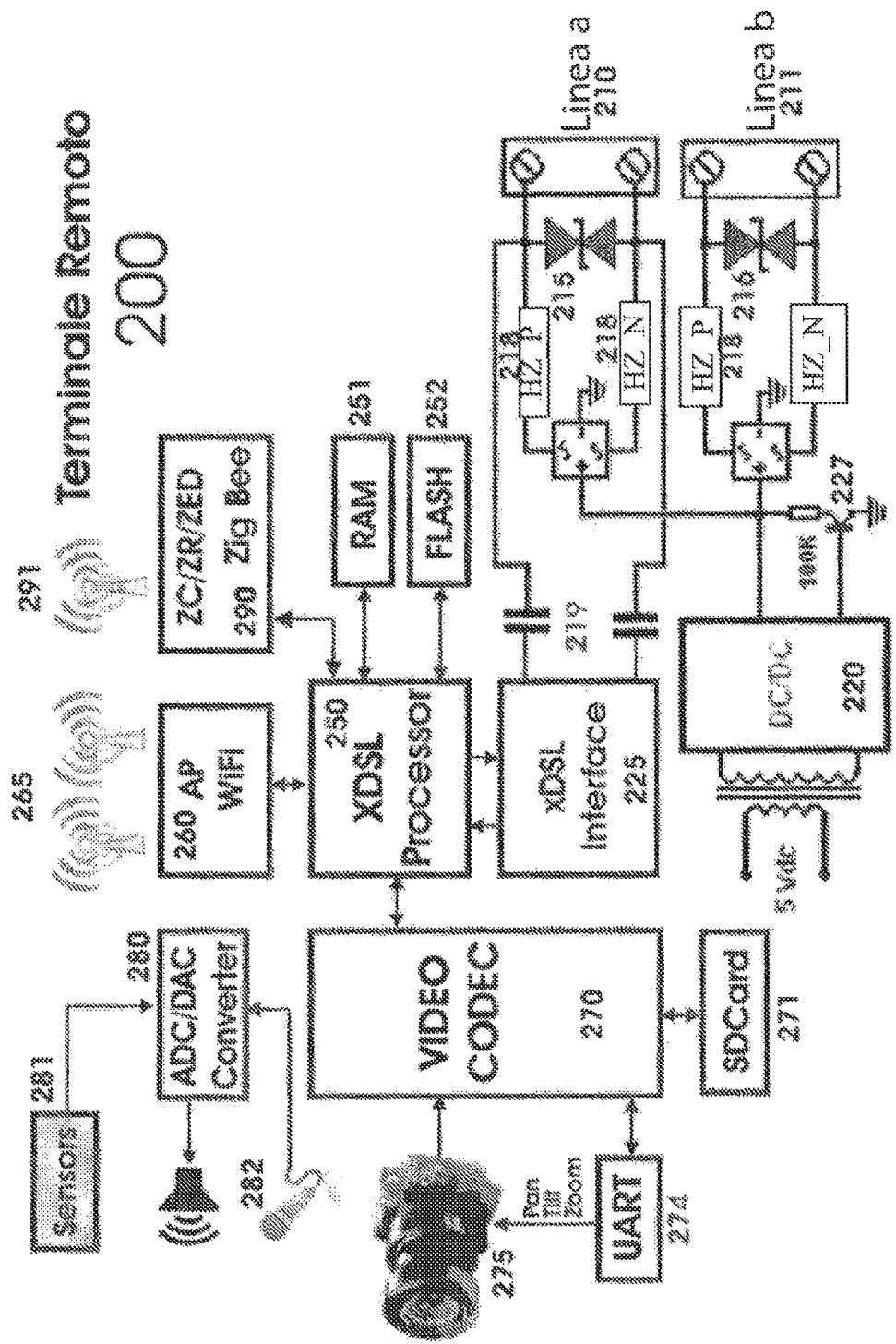
FIG. 10 shows a device for drawing a supply current similar to that disclosed in the international patent application PCT/IT2011/000241, though capable of working on existing telephone systems, that uses the coupling devices of FIGS. 6a and 6b.

From the side of the remotely powered apparatus, there will be a device of the type shown in FIG. 10, corresponding to FIG. 6 of the previously cited international patent application, wherein the blocks 218 are not inductors but are each constituted by the coupling device depicted in FIG. 6a or 6b. The circuit blocks in the enclosed FIG. 10 are identical to and have the same function of the same-name blocks depicted in FIG. 6 of the international patent application PCT/IT2011/000241 and in the excerpts of the description referring to it. Besides the functioning of the blocks depicted in FIGS. 6a and 6b, what is described in the international patent application PCT/IT2011/000241 referring to its FIGS. 4 and 6 may be repeated practically as such for the enclosed FIGS. 9 and 10. It is thus possible to realize remote terminals, tele-monitoring systems and the remote supply modules described in the international patent PCT/IT2011/000241 using the devices in the enclosed FIGS. 9 and 10 instead of those shown respectively in FIGS. 4 and 6 of the cited international patent application.

Figure 11:
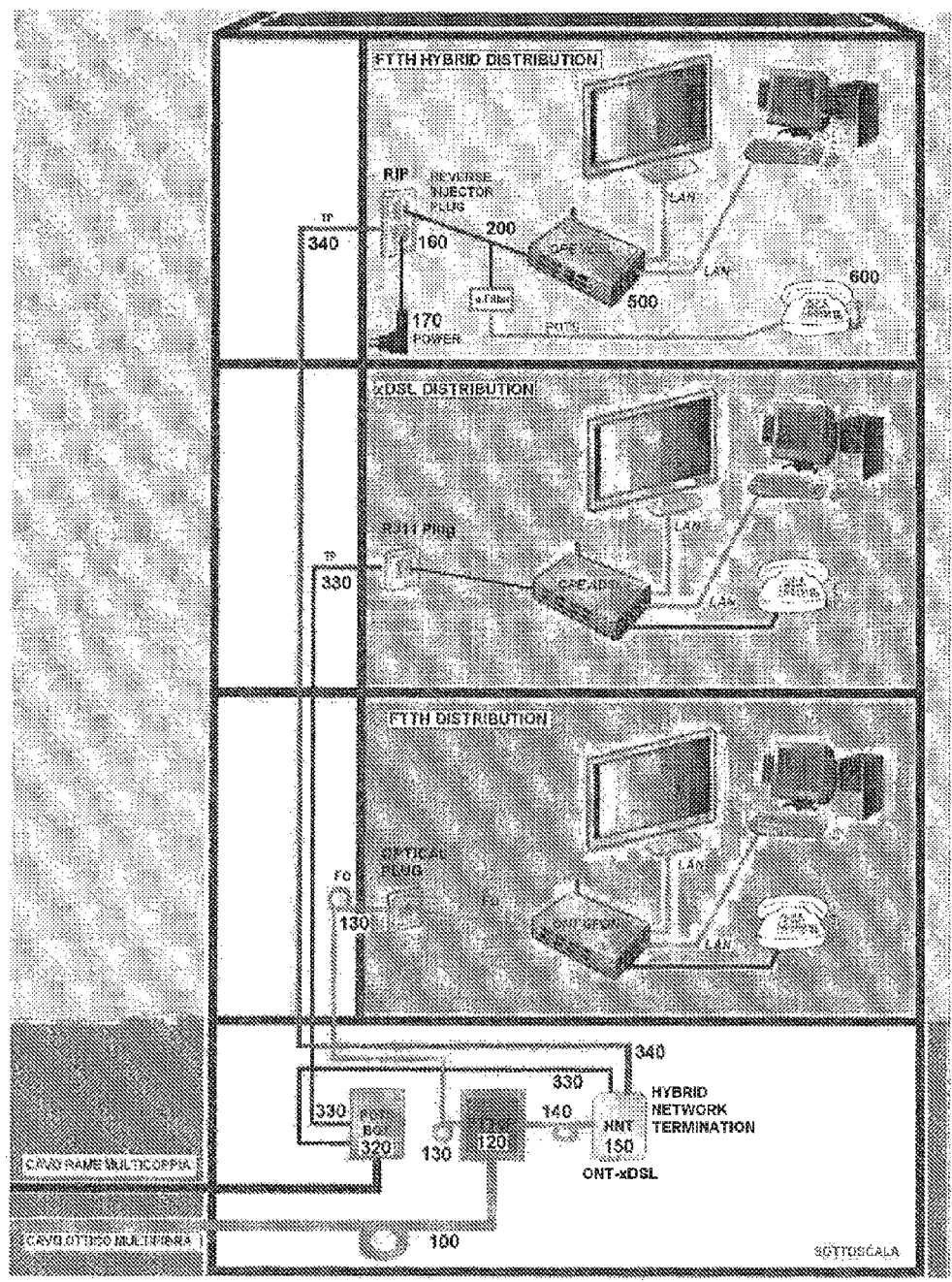
FIG. 11 shows a basic scheme of a telecommunication system realizable in a building that has at least a user with remotely powered telecommunication devices through the same twisted pair on which they receive/transmit data.

With the novel coupling device, it is thus possible to realize systems that allow the distribution of ultra-wide band signals through a xDSL connection over twisted pairs already present in the existing buildings, together with an analog telephone system (POTS) and a remote power supply current of all telecommunication devices. FIG. 11 illustrates schematically a building in which a twisted pair is available, having devices for remote powering and for distributing xDSL ultra-wide band signals that use the novel coupling device. FIG. 11 shows:

- a multi-pair copper cable entering the building towards a derivation block 320, typically placed in the basement of the building, from which at least a twisted pair 330 branches towards a user who does not have telecommunication devices that may be powered through the twisted pair, but are only connectable to the public mains;
- an optical fiber cable 100 entering the building, a block 120 connected to the optical fiber cable, from which a dedicated optical fiber cable 130 branches towards a user who does not have telecommunication devices that may be powered through the twisted pair, and a block 150 that receives digital signals from the dedicated fiber cable 140 for the user and that transmits them towards the twisted pair 340 together with a supply current for telecommunication devices remotely powered through the twisted pair.

By realizing the system as shown in FIG. 11 it is possible to have in a same building users that utilize the twisted pair only for transceiving xDSL ultra-wide band data and users that have telecommunication devices that are powered through the twisted pair and transmit and receive therethrough digital signals and analog signals. The block 150 comprises a known interface circuit that receives the signals coming from the optical multi-fiber cable 100 and from the multi-pair copper cable and sends them down the twisted pair, and includes also a coupling device of the type shown in FIG. 6a or 6b for drawing a remote power supply current from the twisted pair. Hereinafter, this device will be referred to as Optical Network Termination VDSL/POTS or more briefly ONT-VP.

In order to remote power telecommunication devices, it is necessary to install at the user that requires this service a corresponding device for injecting a current, hereinafter called Terminal Equipment-Reverse Powering or more shortly TE-RP, equipped with a xDSL connector and a RJ11 connector for the telephone, as well as an external adapter 170 for connecting to the power supply mains.

Figure 12:
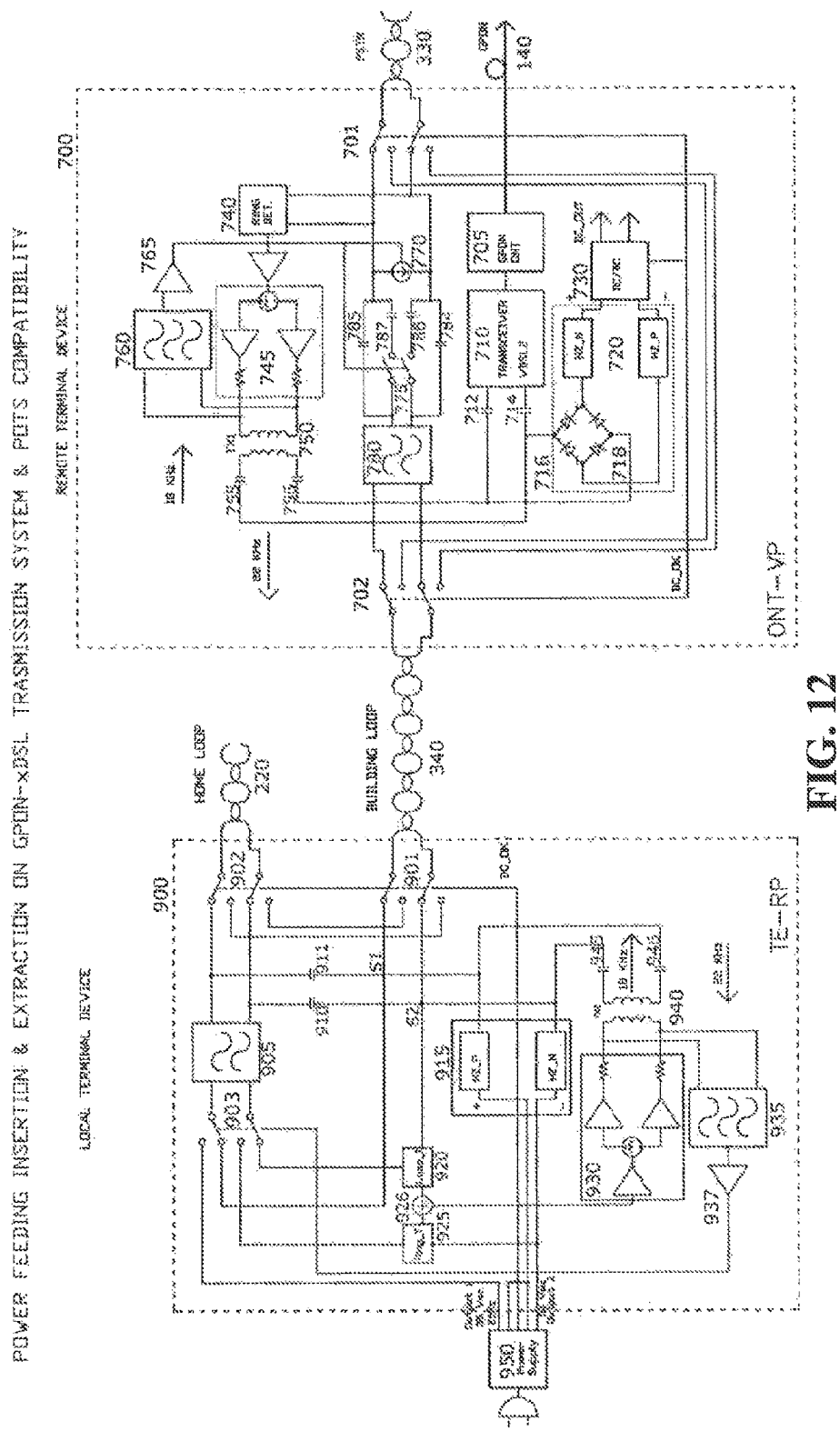
FIG. 12 shows a device 700 for transceiving data and drawing a supply current ONT_VP installable in a basement of a building and a device 900 for transceiving data and injecting a supply current TE-RP installable at a user's home for realizing the system depicted in FIG. 11.
Figure 13:
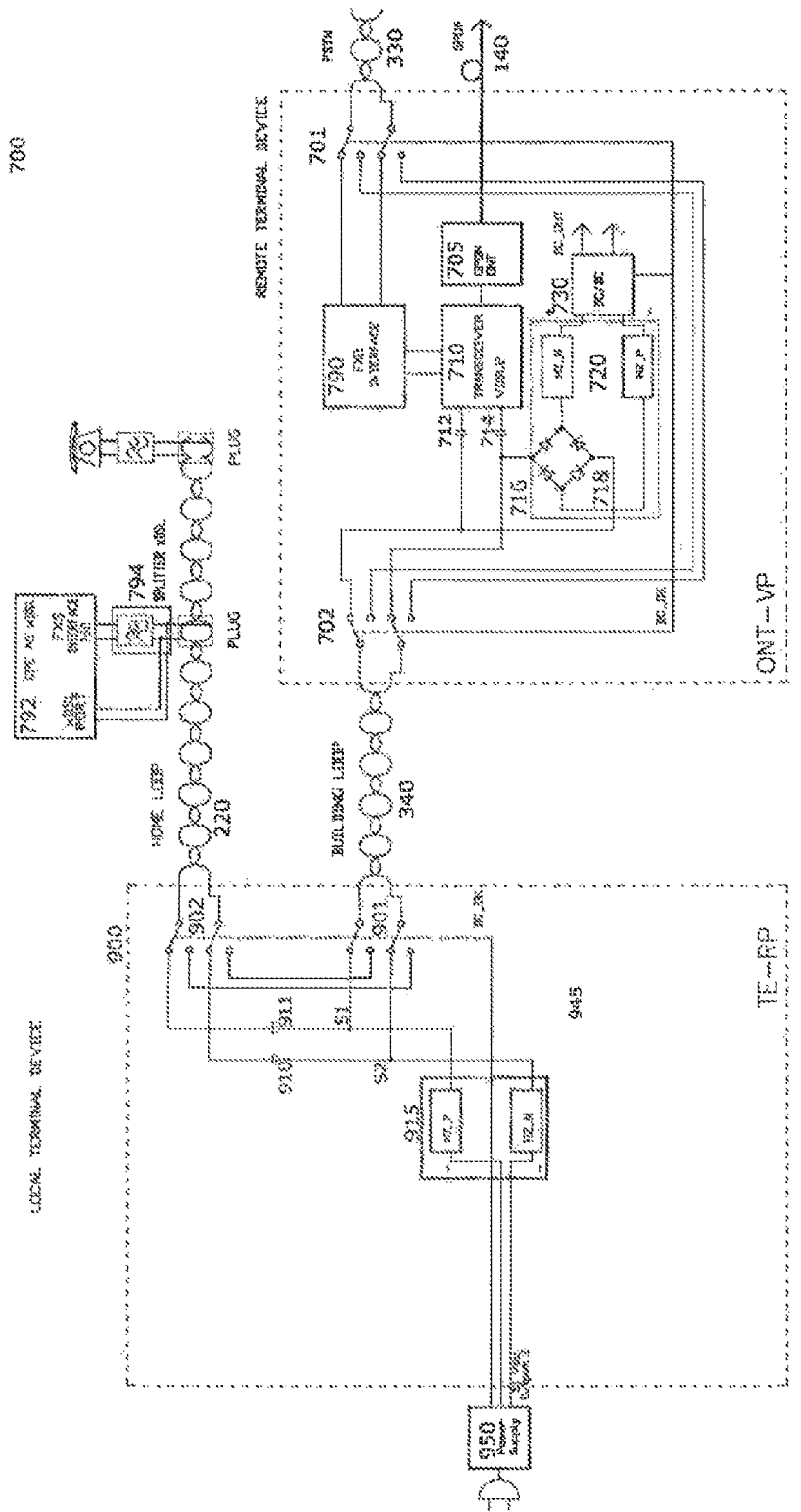
FIG. 13 is similar to FIG. 12 and depicts an alternative embodiment of the device ONT_VP and of the device TE-RP.

Preferred embodiments of the two blocks ONT-VP and TE-RP are depicted in FIG. 12 and in FIG. 13. The function of each block and the meaning of each signal is resumed in the following table:

| | |
|---|---|
| 760, 935 | Pass-band filters |
| 905, 780 | Low-pass filters |
| DC_OK | Command signal active in presence of the mains voltage 220 Vac |
| RING DET | Voltage detector of telephone call |
| TRANSCEIVER VDSL2 | VDSL2 transceiver |
| ONT | Optical Network Termination |
| GPON | Gigabit Passive Optical Network |
| PSTN | Public Switched Telephone Network |
| BUILDING LOOP | building telephone line |
| HOME LOOP | home telephone line |
| FXO INTERFACE | Foreign eXchange Office Interface |
| FXS INTERFACE | Foreign eXchange Station Interface |
| SIP | Session Initiation Protocol |
| VOIP | Voice Over Internet Protocol |

Hereinafter, FIGS. 12 and 13 will be described considering that, in the preferred embodiments, the blocks HZ_P and HZ_N are the coupling devices as shown in FIGS. 6a and 6b, respectively. As stated before, these coupling devices are not encumbering and allow to inject/draw a supply current in/from a telephone line or coaxial cable with reduced Ohmic drops, thus satisfying specifications imposed by the Italian standard. In countries in which the standards are less restrictive, the telecommunication systems depicted in FIGS. 12 and 13 could be realized and could function correctly using low-pass filters instead of the blocks HZ_P and HZ_N. For example, if there were no limits to encumbrance and if compliant with specifications, suitable low-pass filters could be constituted by inductors with a relatively great number of turns and/or R-C networks and/or filters with active electronic components. The characteristics of these low-pass filters will be determined by skilled persons from time to time depending on the specifications to be satisfied, using common knowledge in the art.

Referring to the embodiment depicted in FIG. 12, the functions executed by the terminal ONT-VP 700 relate to the bidirectional transport of data stream between the optical interface 140 and the electric interface 340, comprising the management of signals and of the base phone signal.

It is first examined the circuit that ensures the functioning of the base telephone channel without the mains supply at 220 Vac. The relay 701 is disabled and the telephone signal PSTN available on the twisted pair 330 is brought unchanged at the input of the relay 702, that on its turn is disabled because of lack of power supply and sends the telephone signal towards the user's twisted pair 340. In this way, users may continue using the basic telephone service even in absence of power supply (Lifeline Service). In presence of a power supply, there are three circuit blocks that exploit the functions of electro-optical transduction, power supply and management of signals of the basic telephone channel.

The optical fiber cable 140 coming from the distribution box "FTTdP" is connected through a connector to the electro-optical circuit ONT-GPON 705, that executes and controls all transmitted and received optical streams, that comprises the means for the MAC and for the management of the protocol GPON. The electrical interface, at the output of the circuit 705, is connected to the Transceiver VDSL 710 that realizes the DMT multi-carrier line encoding on the twisted pair 340. The standard G.993.2 presently in force defines a series of waveforms that may be used in function of the length of the copper pair. For this application, in which the distances are shorter than 500 meters, it is possible to have a downstream speed up to 100 Mbit/s.

Through the capacitors 712-714 the output is connected to the user's twisted pair 340 through a relay 702. The bandwidth occupied by the signal VDSL 2 on the user's twisted pair is typically of 30 MHz, starting from a frequency of 25 kHz.

The interface ONT-VP 700 receives the energy necessary for its functioning from the interface TE-RP 900 installed in the user's home, through the same twisted pair through which the VDSL2 stream is transmitted. A remote power supply, provided through the user's twisted pair 340, is drawn from the high impedance circuit 716 composed of the diode bridge 718 and of the novel coupling devices 720, that has the characteristic of reducing DC voltage drops on its terminals and of showing at the same time a high impedance for the signal VDSL2 and for the base-band telephone signals. At the output of the novel coupling devices 720, a DC/DC switching converter 730 is connected that, starting from the input remote power supply voltage, generates the voltages for the functioning of the electronic circuits present in the interface ONT-VP. Power absorbed by the interface ONT-VP 700 typically will be smaller than 6 W, considering also the yield of the DC/DC converter 730. The telephone signal is sent through the twisted pair 340 together with the remote power supply, requested for the functioning of the interface ONT-VP 700.

Because of the presence of this remote power supply, it is necessary to intercept DC telephone signals (dial tone and decadic dialing) and AC signals (ringing signal) and transforming them in out of band tones (between the phone band and the VDSL2 band) to be conveyed on the same user's twisted pair 340. As a matter of fact, when the PSTN telephone exchange sends the ringing signal at 25 Hz or 50 Hz, for ringing a telephone, this signal is detected by the Ring-Detector 740 that activates automatically a tone in the band of free frequency bands (16-25 kHz). Merely as an example, the balanced generator 745, with an internal impedance for example of 600 Ohm, generates a frequency of 22 kHz for a time equal to the presence of the ringing signal (for example: 1 second ON and 4 seconds OFF). In order to obtain the best electrical coupling with the user's twisted pair 340 in terms of ground balancing and isolation in respect to the signal VDSL2, a matching transformer TX1 750 is used. Moreover, capacitors 755 are connected to each wire for preventing application of the remote power supply voltage available on the twisted pair 340 on the terminals of the transformer TX1.

By contrast, when it is necessary to send to the telephone exchange the DC signals sent by the interface TE-RP 900 in the form of tones (for example at 18 kHz), due to the off-hook condition or to the decadic dialing (pulse selection and button R), other electronic circuits available in the ONT-VP detect the presence of the tone and replicate as enveloping signal the DC signals towards the PSTN telephone exchange through the twisted pair 330. More precisely, the tone at 18 kHz crosses the decoupling capacitors 755, the transformer TX1, the band-pass filter 760 and it is detected by the PLL 765. This detector generates a logic command that modulates the current sink 770 that replicates the states ON and OFF on the current, relative to the signals towards the PSTN telephone exchange.

As far as voice signals, DTMF, CLI signals and the billing tone teletax signal at 12 kHz or 16 kHz are concerned, they are transferred in band through the twisted pairs 340 and 330 without any manipulation. The unique operation that is executed is a pass-band (300 Hz-16 kHz) filtering 780 useful for avoiding superposition with the signal VDSI and the signaling tones (for example: 18 kHz and 22 kHz). Even in this case the pass-band filter 780 is connected to the user's twisted pair 340 through coupling capacitors with low capacitance 785 and 784. These capacitors have a low impedance to signaling tones transferred within the phone band (CLI) during the sequence of dial pulses at 25 Hz or 50 Hz. At the same time, this very small capacitances show a high impedance to the ringing signal at 25 Hz or 50 Hz sent by the telephone exchange, such to not disturb the xDSL signal present on the user's twisted pair 340. After the calling phase, when an off-hook condition is detected (presence of the tone at 18 kHz), the relay 775 is closed thus connecting in parallel to the first capacitors two other capacitors 786 and 787 with high capacitance that relevantly reduce frequency attenuations in the voice frequency bandwidth.

Referring to the embodiment shown in FIG. 12, the TE-RP interface couples to the user's twisted pair 340 the telephone system available at the user's location 220, the telephone 600 and the xDSL2 Modem 500. As already stated for the interface ONT-VP, also in the interface TE-RP there are two relays 901 and 902 that, in case of disconnection of the mains voltage at 220 Vac, ensure a correct functioning of the base telephone channel, thus allowing users to continue to use the telephone service (Life Line Service). In this circumstance, the relay 901 is disabled and the telephone connection PSTN, available on the twisted pair 340, is brought unaltered at the input of the relay 902 that, being disabled because the mains voltage is missing, directs signals towards the user's twisted pair 220 and thus the telephone 600. Therefore, in presence of the mains voltage, the connection between the twisted pair 340 and 220 is an open circuit for the DC signal, while it is a closed circuit for the AC signal (telephone signal and xDSL). The AC connection between the twisted pairs 340 and 220 is realized by means of the two capacitors 910 and 911 thus allowing the telephone signals and the xDSL signals to be transferred with a minimum attenuation. Upstream these capacitors 910 and 911, it is possible to inject the remote power supply current towards the twisted pair 340 that supplies, as illustrated above, the ONT-VP interface.

The ONT-VP interface 700 is powered with the energy provided by the interface TE-RP 900 installed in the user's home, through the same twisted pair through which the xDSL stream is transferred. In particular, the remote power supply is equipped with an AC/DC Power Supply converter 950 that converts the mains voltage at 230 Vac in a DC voltage 50 Vdc available on the output 2. An output current, before being applied through the injection nodes S1 and S2 (and arriving through the relay 901 to the twisted pair 340), flows through a high impedance circuit 915 composed of two novel coupling devices HZ-P and HZ-N. The outputs of this circuit 915 are connected to the injection nodes S1 and S2 and thus to the contacts of the relay 901 that transfers them directly on the twisted pair 340, in the normal functioning conditions.

As stated above, down the twisted pair 340 are sent the remote power supply voltage, the xDSL signal and the phone voice signal and it is necessary to intercept the DC phone signals (dial tone and decadic signaling) and AC phone signals (ringing signals) and transforming them in out-of-band tones (between the voice bandwidth and the xDSL bandwidth) to be conveyed on the same user's twisted pair 340. In particular, when the user picks up the handset 600 (off-hook signal) the telephone draws a current flowing through the twisted pair of the user's home 220. This current is supplied by the AC/DC power supply 950 (on the Output 2 at 50 Vdc), through the high impedance circuit 915. More precisely, the positive pole of the coupling device (HZ_P) is coupled to the injection node S1 and through the relay 903 and it is coupled to a wire of the twisted pair of the user's telephone system 220. The other wire, beyond the relay 903, is connected to the current limiter 920, to the injection node S2, the negative terminal of the coupling device (HZ_N) and thus to the negative terminal of the voltage 50 Vdc of the power supply 950.

The circuit Loop-I 920 limits up to a maximum of 50 mA the current that the telephone may absorb in off-hook conditions and at the same time it generates a logic flag that signals when a off-hook condition occurs. This logic off-hook flag flows through the summation node 926 that, as a consequence, enables the balanced generator 930 to emit a tone in the free frequency band 16-25 kHz, for example 18 kHz, towards the remote interface ONT-VP.

The balanced generator 930 generates the tone at 18 kHz on the terminals of the matching transformer TX2 940 necessary to match impedances of the generator to those of the line 340. The capacitors 945 and 946 prevent the remote power supply current to flow throughout the transformer and thus prevent its saturation. The tone at 18 kHz available on the capacitors 945 and 946 is injected through the injection nodes S1 and S2 and thus through the relay 901 it reaches the user's twisted pair 340. In presence of a ringing signal, the remote interface ONT-VP 700 emits a tone at 22 kHz that, through the twisted pair 340, attains the user's terminal TE-RP. This tone flows throughout the relay 901, through the injection nodes S1 and S2 and attains the band-pass filter 935 after having crossed the capacitors 945 and 946 and the matching transformer TX2 940. The filter 935 lets the tone at 22 kHz pass, that is detected by the PLL 937. The PLL outputs a logic command that drives the relay 903 that is switched following the enveloping signal of the tone at 22 kHz (present/absent) and thus the sequence of the ringing tone emitted by the telephone exchange. In presence of the tone at 22 kHz, that is of the ringing voltage at 25 Hz, the relay 903 is enabled and switches, on the user's twisted pair 220, a ringing voltage that is locally generated by the power supply 950.

On the Output 1 of the power supply there is an AC voltage, for example at 25 Hz or 50 Hz, and with an amplitude greater than 35 Vrms. A wire of the generator of signals at 25 Hz is directly connected to the positive terminal of the output 2 (50 Vdc). The other wire is connected to the telephone through the relay 903 and is closed on the negative terminal of the voltage at 50 Vdc on the output 2 through the "ring trip" detector 925. This connection, that is a typical telephonic connection, provides an offset of 50 Vdc to the local ringing signal. If during a ringing phase (the telephone is ringing) the headset is picked-up (off-hook), the ring trip circuit detects the off-hook condition and a relative logic signal is sent to the summation node 926. The output of the summation node enables the balanced generator 930 at 18 kHz that, as already shown for the management of the off-hook condition, is sent down the user's twisted pair 340 towards the remote terminal ONT-VP that sends it back to the telephone exchange.

FIG. 13 shows another embodiments of the interfaces ONT_VP and TE-RP. In the interface ONT-VP the analog telephone channel 330 coming from the telephone exchange is directly connected to an interface circuit FXO 790. This circuit converts the analog telephone signal in digital form (for example with a PCM coding) and in information, depending on the signaling criteria (for example: ringing signal, off-hook signal, billing tone teletax, CLI—Caller Line Identification, etc.). The data stream through the circuit block FXO is received by the Transceiver VDSL2 710 that properly maps this stream in the xDSL channel by using the novel communication protocol VoIP (with an appropriate signaling SIP). This stream VoIP/SIP is sensed by the user's terminal CPE and, through an appropriate software, converted towards the analog telephone through a local interface FXS 796.

The functions performed by the novel user's terminal TE-RP are simpler and relate only to the injection of the remote power supply current through the coupling devices HZ-P and HZ-N and the functioning of the basic telephone system, when the mains voltage at 220 Vac is missing, by means of the relay 901 and 902. In this case, the analog telephone system may be made of a FXS interface available on the CPE-AG (Customer Premises Equipment-Access Gateway) 792 provided to the user, and re-sent throughout a Splitter-xDSL 794 to the user's telephone system 220 as shown in FIG. 13.

The invention claimed is:

1. A coupling device of a DC power supply line to a telephone line or coaxial cable, said coupling device having a first connection pad to a DC power supply line and a second connection pad to a telephone line or coaxial cable adapted to provide a DC voltage and a DC supply current to at least a telecommunication device connected thereto, said coupling device having an electrical path, defined between said first pad and said second pad, adapted to be crossed by said DC supply current,
   at least an AC blocking transistor inserted in said electrical path, having a first current terminal functionally coupled to said first pad and a second current terminal functionally coupled to said second pad;
   a control circuit connected between said second current terminal and a control terminal of said AC blocking transistor, adapted to generate a DC control voltage of the AC blocking transistor to keep it in a linear functioning condition at the edge of a saturation functioning condition when the DC supply current flows through the AC blocking transistor,
   wherein said control circuit is a low-pass filter adapted to generate said control voltage as a low-pass replica of the voltage on said second current terminal.

2. The coupling device of claim 1, further comprising an inductor, inserted in said electrical path, connected between said second current terminal and said second connection pad.

3. The coupling device according to claim 1, wherein said AC blocking transistor is a MOSFET or a BJT, of N-type or of P-type.

4. A device for injecting a DC supply current in a telephone line, comprising:
   a transceiver adapted to transmit/receive signals of digital data;
   a circuit for delivering a supply current (PSE), functionally connected to at least an electrical path, adapted to inject the DC supply current therethrough;
   a coupling device according to claim 1 functionally inserted in said electrical path.

5. A device for drawing a DC supply current from a telephone line, comprising:
   a transceiver adapted to transmit/receive signals of digital data;
   an internal powering circuit for drawing said DC supply current, functionally connected to at least an electrical path to be crossed by the DC supply current flowing therethrough and adapted to provide a voltage and a current for powering the device for drawing;
   a coupling device according to claim 1 functionally inserted in said at least one electrical path.

6. The device for drawing a DC supply current according to claim 5, wherein
   said transceiver is adapted to communications between a xDSL line coupled to said telephone line and a GPON communication; further comprising a phone interface FXO adapted to process POTS signals coming from an interface PSTN, adapted to transcode said POTS signals towards said transceiver.

7. The device for injecting a DC supply current according to claim 4, wherein said telephone line is a twisted pair, the injection device having an electrical path for each wire of the twisted pair and comprising two coupling devices of N-type and of P-type, respectively, wherein said coupling devices have a first connection pad to a DC power supply line and a second connection pad to a telephone line or coaxial cable adapted to provide a DC voltage and a DC supply current to at least a telecommunication device connected thereto, said coupling devices having an electrical path, defined between said first pad and said second pad, adapted to be crossed by said DC supply current,
- at least an AC blocking transistor inserted in said electrical path, having a first current terminal functionally coupled to said first pad and a second current terminal functionally coupled to said second pad;
- a control circuit connected between said second current terminal and a control terminal of said AC blocking transistor, adapted to generate a DC control voltage of the AC blocking transistor to keep it in a linear functioning condition at the edge of a saturation functioning condition when the DC supply current flows through the AC blocking transistor,
- wherein said control circuit is a low-pass filter adapted to generate said control voltage as a low-pass replica of the voltage on said second current terminal; and wherein said AC blocking transistor is a MOSFET or a BJT, of N-type or of P-type, each inserted in a respective one of said electrical paths.

8. The device for drawing a DC supply current according to claim 5, wherein said telephone line is a twisted pair, the device for drawing the DC supply current having an electrical path for each wire of the twisted pair and comprising two coupling devices of N-type and of P-type, respectively, wherein said coupling devices have a first connection pad to a DC power supply line and a second connection pad to a telephone line or coaxial cable adapted to provide a DC voltage and a DC supply current to at least a telecommunication device connected thereto, said coupling devices having an electrical path, defined between said first pad and said second pad, adapted to be crossed by said DC supply current,
- at least an AC blocking transistor inserted in said electrical path, having a first current terminal functionally coupled to said first pad and a second current terminal functionally coupled to said second pad;
- a control circuit connected between said second current terminal and a control terminal of said AC blocking transistor, adapted to generate a DC control voltage of the AC blocking transistor to keep it in a linear functioning condition at the edge of a saturation functioning condition when the DC supply current flows through the AC blocking transistor,
- wherein said control circuit is a low-pass filter adapted to generate said control voltage as a low-pass replica of the voltage on said second current terminal; and wherein said AC blocking transistor is a MOSFET or a BJT, of N-type or of P-type, each inserted in a respective one of said electrical paths.

9. Telecommunication system adapted to be coupled to a telephone line or a coaxial cable of a building, comprising:
- a device for injecting a current according to claim 4, installed at a user location and functionally coupled to the telephone line or coaxial cable of the building, configured such to inject a DC supply current through said telephone line or coaxial cable of the building;
- a device for drawing the DC supply current, wherein said device for drawing a DC supply current from a telephone line, comprises:
- a transceiver adapted to transmit/receive signals of digital data;
- an internal powering circuit for drawing said DC supply current, functionally connected to at least an electrical path to be crossed by the DC supply current flowing therethrough and adapted to provide a voltage and a current for powering the de drawing; and
- a coupling device functionally inserted in said at least one electrical path;
- wherein said coupling device has a first connection pad to a DC power supply line and a second connection pad to a telephone line or coaxial cable adapted to provide a DC voltage and a DC supply current to at least a telecommunication device connected thereto, said coupling device having an electrical path, defined between said first pad and said second pad, adapted to be crossed by said DC supply current,
- at least an AC blocking transistor inserted in said electrical path, having a first current terminal functionally coupled to said first pad and a second current terminal functionally coupled to said second pad;
- a control circuit connected between said second current terminal and a control terminal of said AC blocking transistor, adapted to generate a DC control voltage of the AC blocking transistor to keep it in a linear functioning condition at the edge of a saturation functioning condition when the DC supply current flows through the AC blocking transistor,
- wherein said control circuit is a low-pass filter adapted to generate said control voltage as a low-pass replica of the voltage on said second current terminal;
- said device for drawing the DC supply current installed at a location of the building, functionally coupled to the telephone line or coaxial cable of the building such to draw the DC supply current and to transmit/receive data signals through the supply line or coaxial cable of the building towards/from said device for injecting a current.

10. The telecommunication system adapted to be coupled to a telephone line or a coaxial cable of a building according to claim 9, wherein said transceiver is adapted to communications between a xDSL line coupled to said telephone line and a GPON communication; further comprising
- a phone interface FXO adapted to process POTS signals coming from an interface PSTN, adapted to transcode said POTS signals towards said transceiver.

11. The coupling device according to claim 2, wherein said AC blocking transistor is a MOSFET or a BJT, of N-type or of P-type.

12. A device for injecting a DC supply current in a telephone line, comprising:
- a transceiver adapted to transmit/receive signals of digital data;
- a circuit for delivering a supply current (PSE), functionally connected to at least an electrical path, adapted to inject the DC supply current therethrough;
- a coupling device according to claim 2 functionally inserted in said electrical path.

13. A device for injecting a DC supply current in a telephone line, comprising:
- a transceiver adapted to transmit/receive signals of digital data;

a circuit for delivering a supply current (PSE), functionally connected to at least an electrical path, adapted to inject the DC supply current therethrough;

a coupling device according to claim 3 functionally inserted in said electrical path.

14. The device for injecting a DC supply current in a telephone line according to claim 13, further comprising an inductor, inserted in said electrical path, connected between said second current terminal and said second connection pad.

15. A device for drawing a DC supply current from a telephone line, comprising:

a transceiver adapted to transmit/receive signals of digital data;

an internal powering circuit for drawing said DC supply current functionally connected to at least an electrical path to be crossed by the DC supply current flowing therethrough and adapted to provide a voltage and a current for powering the device for drawing;

a coupling device according to claim 2 functionally inserted in said at least one electrical path.

16. The device for drawing a DC supply current according to claim 15, wherein said transceiver is adapted to communications between a xDSL line coupled to said telephone line and a GPON communication; further comprising a phone interface FXO adapted to process POTS signals coming from an interface PSTN, adapted to transcode said POTS signals towards said transceiver.

17. A device for drawing a DC supply current from a telephone line, comprising:

a transceiver adapted to transmit/receive signals of digital data;

an internal powering circuit for drawing said DC supply current functionally connected to at least an electrical path to be crossed by the DC supply current flowing therethrough and adapted to provide a voltage and a current for powering the device for drawing;

a coupling device according to claim 3 functionally inserted in said at least one electrical path.

18. The device for drawing a DC supply current according to claim 17, wherein said transceiver is adapted to communications between a xDSL line coupled to said telephone line and a GPON communication; further comprising a phone interface FXO adapted to process POTS signals coming from an interface PSTN, adapted to transcode said POTS signals towards said transceiver.

19. The device for drawing a DC supply current according to claim 8, wherein said transceiver is adapted to communications between a xDSL line coupled to said telephone line and a GPON communication; further comprising a phone interface FXO adapted to process POTS signals coming from an interface PSTN, adapted to transcode said POTS signals towards said transceiver.

\* \* \* \* \*